(12) United States Patent
Fenney

(10) Patent No.: US 6,741,247 B1
(45) Date of Patent: May 25, 2004

(54) SHADING 3-DIMENSIONAL COMPUTER GENERATED IMAGES

(75) Inventor: Simon Fenney, St. Albans (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 09/831,239

(22) PCT Filed: Nov. 8, 1999

(86) PCT No.: PCT/GB99/03704
§ 371 (c)(1),
(2), (4) Date: May 3, 2001

(87) PCT Pub. No.: WO00/28480
PCT Pub. Date: May 18, 2000

(30) Foreign Application Priority Data

Nov. 6, 1998 (GB) ............................................. 9824412

(51) Int. Cl.⁷ ............................................. G06T 15/40
(52) U.S. Cl. ..................... 345/421; 345/420; 345/422; 345/426; 345/441
(58) Field of Search .................. 345/421, 422, 345/426, 441, 582, 589, 606, 611, 661, 420

(56) References Cited

U.S. PATENT DOCUMENTS 5,729,672 A * 3/1998 Ashton ....................... 345/589

FOREIGN PATENT DOCUMENTS

| EP | 0 422 541 | 4/1991 |
| EP | 0 549 183 A | 6/1993 |
| EP | 0 758 118 A | 2/1997 |

OTHER PUBLICATIONS

United Kingdom Patent Office Examination Report, dated Jul. 24, 2002, for Application No. GB 9824412.2.

* cited by examiner

Primary Examiner—Mark Zimmerman
Assistant Examiner—Kimbinh T. Nguyen
(74) Attorney, Agent, or Firm—Flynn, Thiel, Boutell & Tanis, P.C.

(57) ABSTRACT

An apparatus for shading 3-dimensional computer generated images representing each object in the image by a set of flat polygons. Vertex data (x, y) is supplied for each vertex of the polygon along with data which defines the orientation of the surface of the polygon. Edge data is computed in edge processors. The edge data is equivalent to data which defines a surface which is perpendicular to a viewpoint and which faces inwardly towards the polygon. For each pixel which is used to view the portion of the image in which the polygon is located, a depth value is derived for each of these surfaces and, when the depth values indicate that the polygon is visible at the pixel, it is shaded accordingly.

17 Claims, 6 Drawing Sheets

VERTEX REPRESENTATION

TABLE 1

| TEST POINT | TRIANGLE | EDGE ORIENTATION | CONDITION FOR TEST POINT ON OUTSIDE OF EDGE. |
|---|---|---|---|
| (bottom-right) | CW | △ (rightward) | $y < mx + c$ |
| (bottom-left) | CW | △ (rightward-down) | $y < mx + c$ |
| (top-left) | CW | ▽ (rightward-down) | $y > mx + c$ |
| (top-right) | CW | ▽ (leftward) | $y > mx + c$ |
| (top-left) | ACW | ▽ (rightward-up) | $y > mx + c$ |
| (top-right) | ACW | ▽ (down) | $y > mx + c$ |
| (bottom-right) | ACW | △ (leftward) | $y < mx + c$ |
| (bottom-left) | ACW | △ (rightward-up) | $y < mx + c$ |

FIG. 9

SHADING 3-DIMENSIONAL COMPUTER GENERATED IMAGES

FIELD OF THE INVENTION

This invention relates to the shading of 3-dimensional computer generated images and to a method and apparatus for performing this.

BACKGROUND OF THE INVENTION

In our British Patent No. 2281682, there is described a 3-D rendering system for polygons in which each object in a scene to be viewed is defined as a set of surfaces which are infinite. Each elementary area of the screen in which an image is to be displayed has a ray projected through it from a viewpoint into the 3-dimensional scene. The location of the intersection of the projected ray with each surface is then determined. From these intersections it is then possible to determine whether any intersected surface is visible at that elementary area. The elementary area is then shaded for display in dependence on the result of the determination.

The system can be implemented in a pipeline type processor comprising a number of cells, each of which can perform an intersection calculation with a surface. Thus a large number of surface intersections can be computed simultaneously. Each cell is loaded with a set of coefficients defining a surface for which it is to perform the intersection test.

A further improvement which is described in our UK Patent Application No. 2298111 sub-divides the image plane into sub-regions or tiles. This proposes using a variable tile site and projecting a bounding box around complex objects. This is done by firstly determining the distribution of objects around the visible screen for suitable tile sizes to be selected. The surfaces defining the various objects are then stored into one contiguous list. This avoids the need to store identical surfaces for each tile, as one object being made of many surfaces could be in a number of tiles. The tiles can then be rendered in turn using the ray casting technique described above, one at a time rendering all objects within that tile. This is an efficient method because no effort needs to be made to render objects which are known not to be visible in a particular tile.

SUMMARY OF THE INVENTION

We have appreciated that the amount of processing can be reduced further if only data pertaining to portions of surfaces which are in fact visible is processed. Thus, in accordance with a preferred embodiment of the invention we provide a method for defining the edges of visible surfaces with planes which are perpendicular to the viewing direction, the image plane of the image.

In accordance with a second aspect of the invention, we have appreciated that, rather than use a variable tile size, the processing may be optimised by using a regular tile size across the whole of the image plane wherein the tile boundaries may intercept with objects but with no edge clipping being necessary. A set of tiles can then be selected which define a bounding box for a particular object and, in order to render that particular object, only the tiles within that particular bounding box needs to be processed. A display list of the surfaces which fall within that tile is used to define objects within the bounding box.

A further improvement on this method discards the tiles within a bounding box which do not actually contain the object to be rendered.

BRIEF DESCRIPTION OF THE DRAWINGS

Preferred embodiments of the invention will now be described in detail by way of example with reference to the accompanying drawings in which:

FIG. 9 shows a table which illustrates the tests used to determine the tiles in FIG. 8 which are not required to display the triangle.

DETAILED DESCRIPTION

In our British Patent No. 2281682, the rendering system summarised in the introduction of this specification is described. We have appreciated that any object can be modelled as a set of triangles. Thus, these would be the infinite surfaces which would be processed in that patent. In that patent, the edges of the objects would comprise the intersections of the infinite surfaces and the relative depths of forward and backward facing surfaces used to determine whether or not a particular surface was visible (if a backwards facing surface is closer than a forwards facing surface then neither is visible at a particular pixel).

We have appreciated that processing can be improved by defining the edges of triangles by infinite surfaces which are perpendicular to the image plane. Thus, for a triangle, four surfaces are required, one for the face and three for the edges, one per edge.

Figure 1:
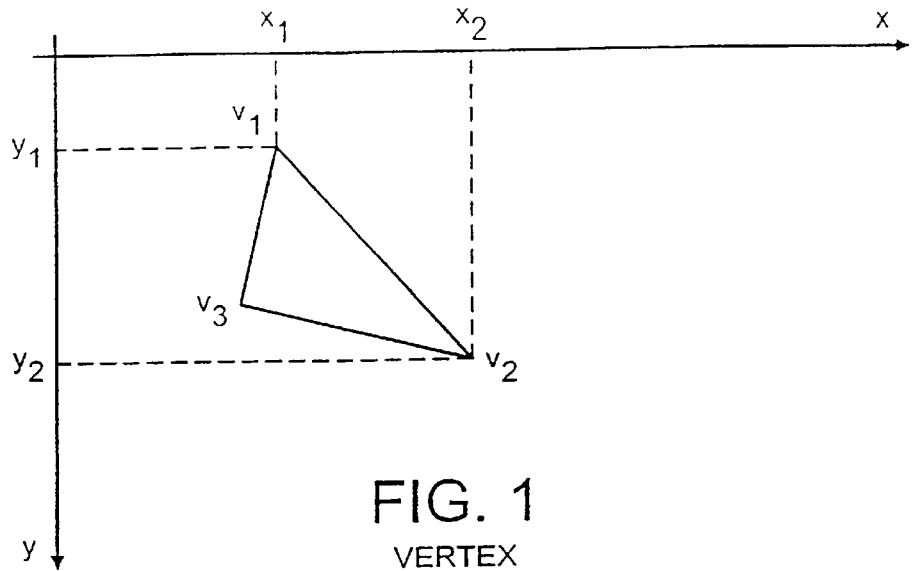
FIG. 1 shows a graphical representation of a triangular surface for use in representing a portion of an object.

Before a triangle can be rendered, it is necessary to calculate the equations for each surface. These are calculated in a polygon setup unit from vertex data supplied by the application software. The equation for a perpendicular edge surface between two vertices $v_1$ and $v_2$, shown in FIG. 1 and which are located at $(x_1, y_1, z_1)$ and $(x_2, y_2, z_2)$ is defined by:

$$(y_2-y_1)x+(x_1-x_2)y+(x_2y_1-y_2x_1)=0$$

which is of the form:

$$Ax+By+C=0$$

which is the equation of a plane surface.

Figure 2:
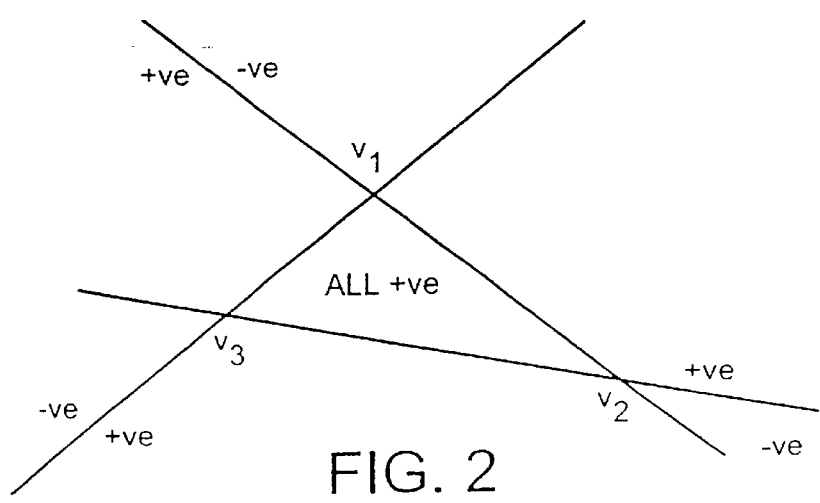
FIG. 2 shows how the positive and negative sides of the surfaces are used to determine the visible portion of the triangle of FIG. 1.

When the xy coordinates of a pixel location, hereinafter the xy location, are applied to the above equation and the equation has a positive result for the particular location, then the xy location is on the forward facing side of the edge surface. When the output of the equation has a negative value, then the xy location is on the backward facing side of the surface. Thus, when all four equations representing the triangle in FIG. 1 have a positive value then the pixel position is within the triangle as illustrated in FIG. 2. This rule holds true for any shape used in preference to a triangle, e.g., a quadrilateral.

Figure 3:
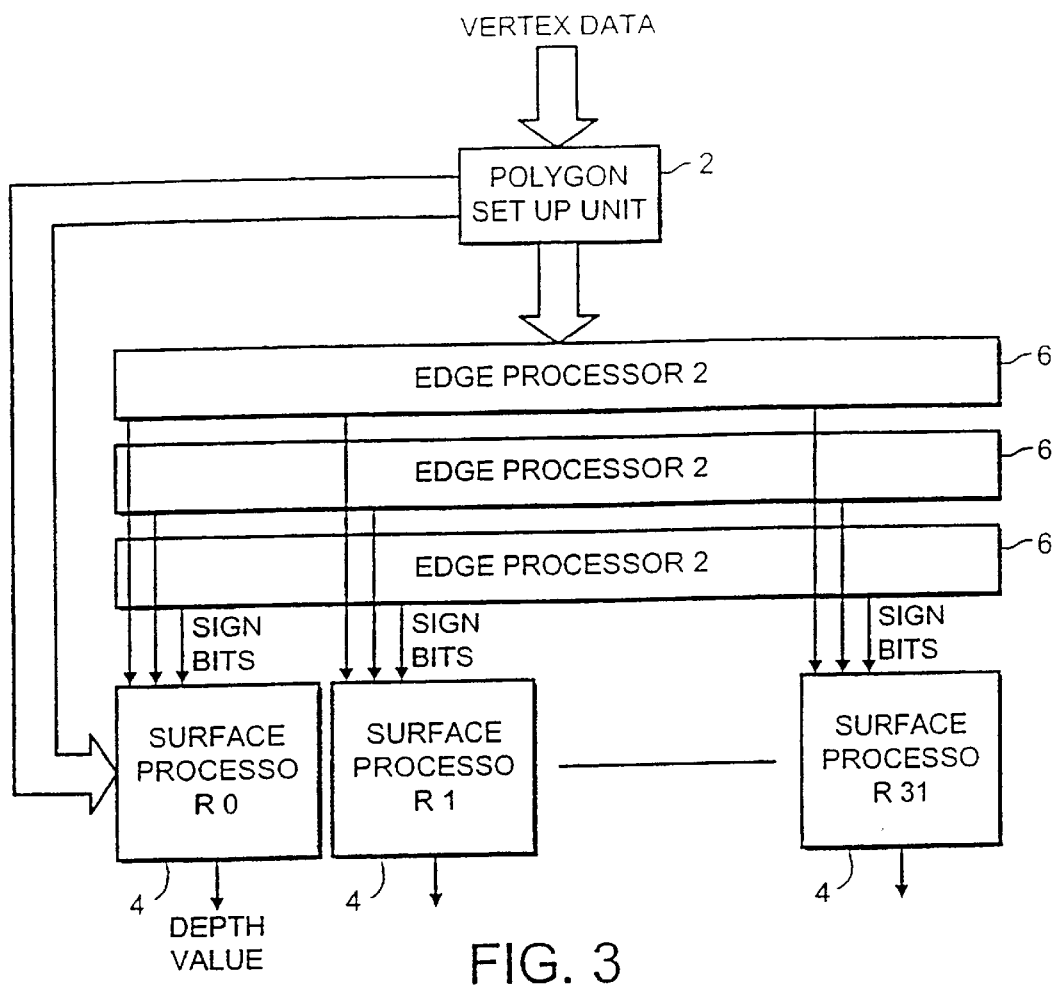
FIG. 3 shows schematically the edge processors and surface processors used to shade the triangle of FIG. 2.

A preferred embodiment of the invention is shown in FIG. 3. In this, there is a polygon setup unit 2 which receives vertex data defining triangles and supplies the facing surface data for the triangles to respective ones of the set of 32 surface processors 4. At the same time, each triangle is being processed by a surface processor 4, polygon setup unit 2 supplies three sets of edge data to each one of three arrays of edge processors 6. Edge processors 6 each comprise a depth evaluation unit which determines whether or not the value for the edge surface edge processors 6 are processing is positive or negative for each of 32 particular pixel locations. The outputs of each edge processor 6 is a positive or negative sign bit. The output sign bits for the three surfaces for each triangle supplied to the appropriate surface processor 4 for that triangle. When all of the sign bits are positive as described above then that surface processor 4 knows that the triangular surface it is processing is visible, that is to say it is not outside the edge of the triangle. If this is the condition, the surface processor 4 will supply a depth value as an output which will go to a depth store. Later further tests can be made on the triangle based on the depth value to determine whether or not the triangle is to be used to make a contribution to the image being processed. If one of the sign bits is negative then the surface processor 4 does not need to do anything.

The edge processors operate in the x direction, i.e., along a scan line in an image and, in a system which uses an array of 32 surface processors 4, will typically operate in a tile based system processing blocks of 32×32 pixels. The input value to each edge processor will therefore be equivalent to By+C. The edge processor uses an inaccurate non-restoring division algorithm which operates on the edge of the triangle. This algorithm effectively calculates $$X = \frac{C}{A}$$

This is possible because the y value is constant for a particular value of x and thus the C value is a constant along a particular scan line.

Table 1 shows the arithmetic operation involved in calculating the position of a transition point from inside to outside (positive to negative depth) of an edge.

TABLE 1

Inaccurate Non-Restoring Division in an Edge Processor

| A | C | Operation |
|---|---|---|
| Shift A left 4 (16 × A) | C | Add |
| Shift A left 3 (8 × A) | $16A + C = C_1$ | If $C_1 >= 0$ and $A >= 0$ then Subtract, otherwise Add |
| Shift A left 2 (4 × A) | $C_1 \pm 8A = C_2$ | If $C_2 >= 0$ and $A = 0$ then Subtract, otherwise Add |
| Shift A left 1 (2 × A) | $C_2 \pm 4A = C_3$ | If $C_3 >= 0$ and $A >= 0$ then Subtract, otherwise Add |
| A | $C_3 \pm 2A = C_4$ | If $C_4 >= 0$ and $A >= 0$ then Subtract, otherwise Add |

TABLE 1-continued

Inaccurate Non-Restoring Division in an Edge Processor

| A | C | Operation |
|---|---|---|
| A | $C_4 - A = C_5$ | If $C_5 >= 0$ and $A >= 0$ then Subtract, otherwise $C_5$ |
|   | $C_5 (-A) = C_6$ | |

The operation performed in the first stage effectively moves the sample point to the middle in terms of x. This is possible because the setup unit moves the origin location (x,y)=(o,o) to the top lefthand corner of the tile. The operation column indicates the test performed to calculate whether an addition or subtraction should be performed on the accumulated C value in the next clock cycle. These tests are essentially a form of an iterative binary search, where each addition/subtraction moves us closer to the zero crossing point. For example, say that the 0 transition is at 13.

|  |  |  | x location |
|---|---|---|---|
| Start | C = −ve | A + +ve | 0 |
| Add 16 | C = +ve |  | 16 |
| Sub 8A | C = −ve |  | 8 |
| Add 4A | C = −ve |  | 12 |
| Add 2A | C = +ve |  | 14 |
| Sub A | C = 0 (+ve) |  | 13 |
| Sub A |  |  | 12 |

The sign of the additions/subtractions which are performed by the edge processor are used to calculate the transition point or edge. Once this pixel position has been determined, the position is used to create a mask for a whole line of the tile. This mask represents a positive/negative depth value for each pixel within the line. The operation may be pipelined using the arrays of depth processors referred to above so that an edge mask for a line of pixels within a tile can be created every clock cycle. As explained above, the y coefficient for the edge equation is accumulated into constant C before the edge is processed. This allows an edge mask for a complete tile of 32×32 pixels to be generated over 32 clock cycles where h is the height of the tile.

The masks for all three edges in the triangle are ANDed together to create a depth mask for the triangle. The signs of the accumulated depth at the pixel position is passed to the surface processors 4. When the depth is positive, the surface is visible. Thus, using this method, a triangle can be processed at the same speed as a single surface. Clearly, if four edge processors or more were available then quadrilaterals and other more complex shapes could be processed.

When the screen of the image is divided into a plurality of tiles, the current hardware implementations require all objects within the scene to be processed for each tile. This is inefficient since it means that all the tiles have to be processed for all the objects.

Figure 4:
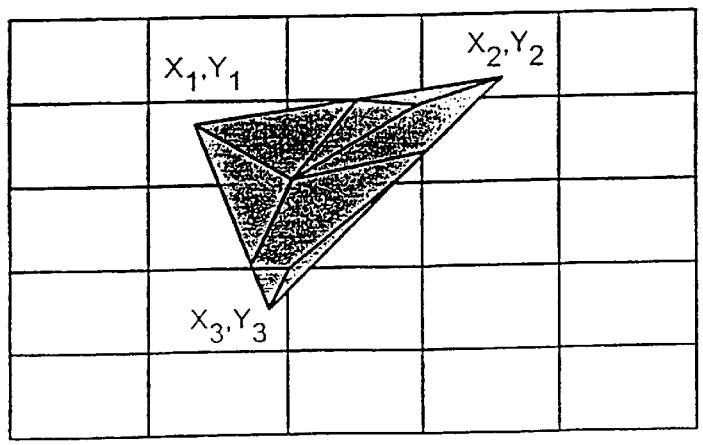
FIG. 4 shows schematically a screen with an object on it with the screen divided into an array of 25 tiles and with an object broken up into triangles in a conventional method.

In conventional rendering systems, rendering of the screen on a tile by tile basis requires objects to be clipped to tile boundaries, and therefore data defining the intersections with tile boundaries has to be defined (see FIG. 4).

It is only necessary to process the objects which intersect with a particular region area. As explained above, if an object is defined in screen space, then a comparison of the vertices which define the object, such as a triangle, will yield a bounding box for that object. A bounding box defines a rectangular area within the screen which contains the object.

FIG. 4 shows a tiled region of the screen with an object represented by a number of triangles within it.

A bounding box for a particular object can be aligned to tile boundaries so that a list of tiles within the bounding box can then be obtained. This list of tiles is a subset of all the tiles within the screen and approximates the tiles which intersect with the object. In the event that the bounding box with the object intersects with the whole of the screen area, then the object parameters (coordinates, shading data, etc.) are written into an area of memory within the system and a pointer to the start of the object data is generated.

Figure 5:
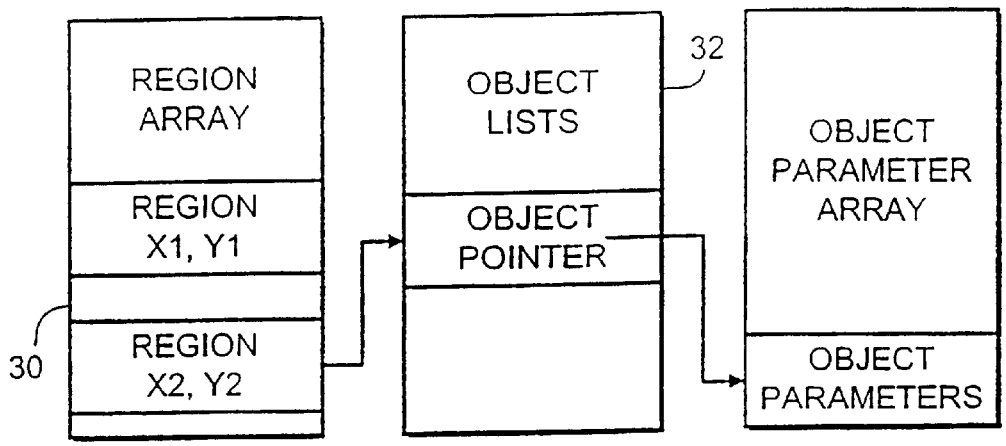
FIG. 5 shows schematically the object lists which are used in accordance with an embodiment of the invention.

The present rendering system operates on a tile by tile basis, processing the objects for each tile before progressing onto the subsequent one. The data structure is therefore used to identify the objects which must be processed for each tile. This is shown in FIG. 5. In this, a list of tiles within the screen is created in a region or tile array 30. Each tile is defined by x and y limits. For each tile, a list of pointers to objects which must be processed for that tile is generated as an object list 32. There is a separate object list for each tile pointed to by the region array. The bounding box idea is used to create a list of tiles (with object lists) to which the object pointer, which is created when data is written to memory, must be added. However, the hardware needs to identify the tail of each tile object list so that an address for the object pointer to be written to can be derived. The most simple method of doing this is to store a tail pointer which points to the next free location on the list. This can be a header in the object list.

An enhancement of this is to use a cache which can be a smaller size. The cache stores a sub-set of the tail pointers. An object will generally cross multiple tile boundaries. Therefore, a miss upon the cache results in multiple tail pointers being read into the cache and predicting the tiles which the object traverses. This increases the efficiency of the cache. This also enables multiple images to be tiled at the same time by interleaving the object data and changing the cache contents. This switching involves storing the contents of the tail pointer cache, adjusting the area of memory linked to the cache and the area of memory used for storing objects. The effect of the context is now changed. That is to say, the cache is invalidated and a different set of data is now available to be tiled. To switch context back is the reverse operation and involves storage of the new context, the reversion of cache and object memory locations, and the invalidation of current cache.

The information for the object lists is now available. An address for the pointer which comes from the tail pointer cache and an object pointer pointing to an object which has a bounding box intersecting with that tile. All the object lists entries for the object being processed can then be written to memory and the next object processed.

Figure 11:
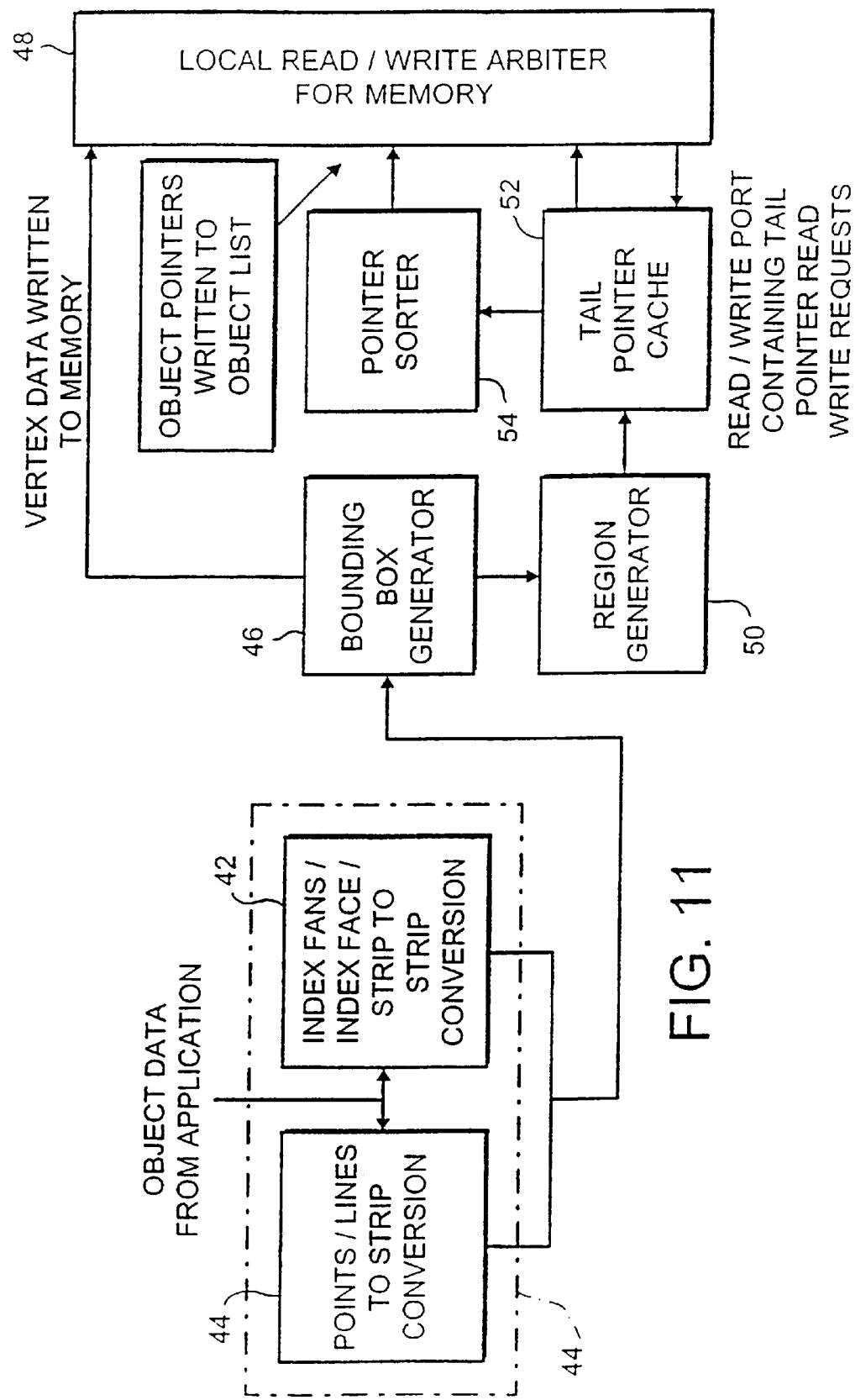
FIG. 11 shows a block diagram of the circuits used to generate bounding boxes.

This is implemented using the circuitry of FIG. 11. In this, object data is received from the application program in the form of triangles, fans, strips and points. Initially the object data is all converted into strips, in a conversion unit 40. These are efficient in their memory usage. The converter 40 comprises a converter 42 for converting fans and faces to strips and converter 44 for points and lines to strips. The strip data is then provided to a bounding box generator 46 which calculates the bounding box for each triangle within the strip, and the bounding box for the whole strip. If the bounding box intersects with the screen area, the object data is written to memory via local read/write arbiter 48, starting from the next available location. Otherwise the system moves on to the next strip. The address which this data is written to is passed down the pipeline.

A region generator 50 receives the bounding box information and generates a mask and tile identity for each tile within the bounding box for the whole strip. The tile identity is used to access a tail pointer cache 52 to read the next available pointer location. If this is the last address within the block, a new pointer block is allocated for this tile, and a link from the current block to the new one is generated.

A write request to a free address for the pointer, with the object address, and the mask for that object is placed into a queue. The tail pointer for the tile is then updated through the cache with the next available pointer. When there are sixteen entries in the write queue, the requests are sorted by page address, by the pointer sorter 54. These are written into the memory in a first access. This reduces the number of page breaks to the memory.

The most common type of cheap block RAM is DRAM. This is structured in pages and accesses which traverse pages. This is because there is a performance cost due to closing the current page and opening a new page. However, writing a pointer to the same object into multiple lists involves a large number of page transitions as each list may be on a different page. However, it is probable that there will be a similarity between one incoming object and the next object. This means that the next object is likely to be placed in similar object lists as current and previous objects. With an object list, the addresses are essentially sequential and it is therefore desirable to write as many pointers within the same list at the same time as there is address coherency between pointers, this may be achieved by storing a number of pointers (e.g. over a range of objects) and sorting them into page groups before writing them to memory. This greatly reduces the number of page transitions and therefore increases the efficiency of the system.

For a given object data set for an image, it is not possible to determine the number of objects which will be visible in each tile. The worst case scenario is that it will be necessary to allocate enough memory for a pointer to every object for every tile. This would require a large amount of memory and increase the system cost. This can be reduced by allocating blocks for each object list and, when a block has been filled, allocating a new block and inserting a link to the new block. This means that the memory used is closer to the minimum amount required for object list storage. The size of a block will depend upon many factors such as the width of the memory and the available bandwidth.

Figure 6:
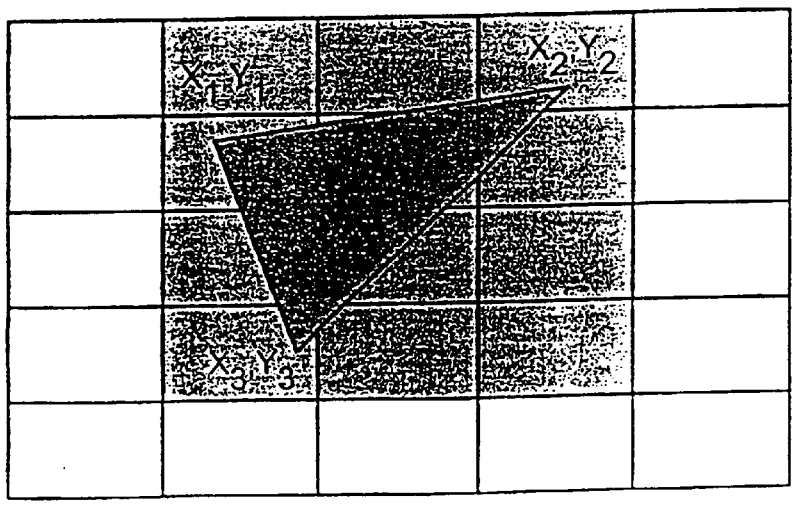
FIG. 6 shows a triangle within a bounding box of 12 tiles.
Figure 7A:
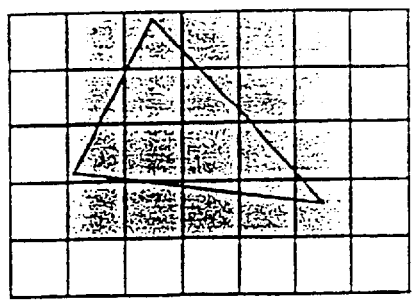
FIGS. 7a, b, c and d show a number of different triangles with different bounding boxes and the different numbers of tiles required to display them.
Figure 7B:
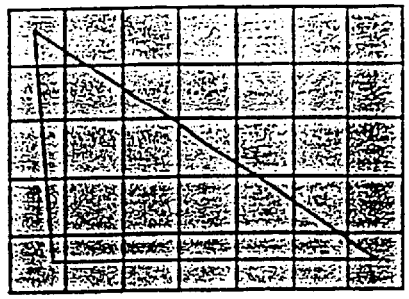
Figure 7C:
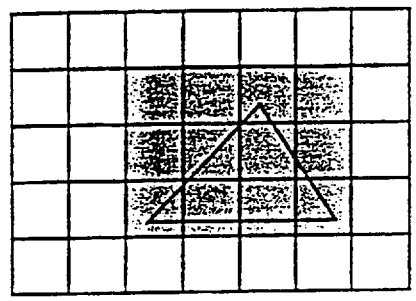
Figure 7D:
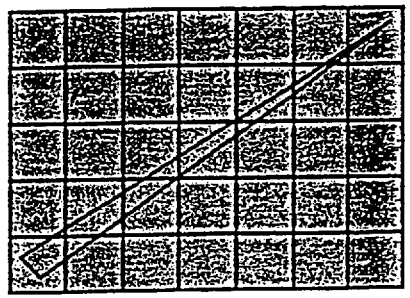

In order to reduce both the number of object pointers and the size of object data further, another aspect of object coherency can be used. Since generally a group of triangles will be used to represent a larger object such as a tea-pot or sphere or animal, etc., there will be a large amount of commonality between triangles, i.e., the triangles will share vertices between them. By comparing the vertices against each other, it is possible to convert triangles to strips. A strip takes up less area of memory as only one or two vertices are required to define a new triangle and only one pointer is then required to point to all the objects in the strip. This reduces the number of object pointers even further and also reduces the amount of memory required, thereby resulting in an increase in efficiency in terms of memory and a performance increase due to bandwidth optimisations. In FIG. 6 there is illustrated a triangle and a bounding box, this being the shaded portion. When it is processed using conventional methods, the region within which it falls covers a 5×5 array of tiles and it would be necessary to process it 25 times. However, if the image is first processed using a bounding box, to define the region which holds the range of x,y coordinates used by the triangle, it can be shown that the triangle only needs to be processed 12 times, i.e., it covers 12 tiles.

We have further appreciated that in fact the triangle only falls within 10 of the tiles in the 4×3 array. Thus reducing further the processing overhead.

Figure 8:
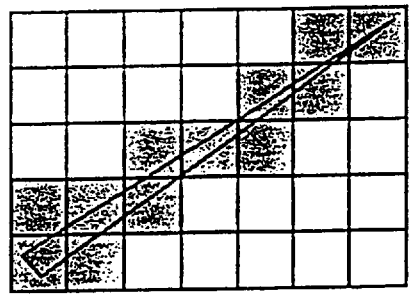
FIG. 8 shows an optimised selection of tiles for the triangle in FIG. 7d.

Other examples of triangles which do not cover the whole of the rectangular bounding box required to process them are shown in FIGS. 7a–d. The most extreme example of these is FIG. 7d in which the triangle shown only in fact falls in the 12 tiles illustrated in FIG. 8. It will be preferable to process only this set of tiles in order to render that triangle.

The calculation of the minimal set of tiles to represent a triangle begins with the crude rectangular bounding box calculation. If the bounding box is only a single tile in either height or width, there is clearly no further optimisation that can be performed. Otherwise the set will be reduced by consideration of each edge of the triangle in turn.

Firstly, it is necessary to know whether the triangle is defined by a clockwise or (cw) anti-clockwise (acw) set of points. If this information is not available, it can easily be calculated.

An edge can then be considered to be an infinitely long line which divides the space into two halves. Subspaces on either side of the edge are described as being inside or outside the edge using the edge processors described above with the inside sub-space being the one that contains the triangle to which the edge belongs. The triangle has its corners at the intersections of the edge lines and the surface is the intersection of the inside sub-spaces of the three edges.

Any tile that lies entirely on the outside of an edge is not part of the minimal set because the triangle would not be visible in that tile. If an edge is entirely horizontal or vertical it need not be considered since all the tiles in the rectangular bounding box already lie wholly or partly inside the edge.

In order to test whether a tile lies wholly on the outside of an edge, we need only test the point on that corner of the tile which is closest to the edge. If that point is on the outside of the edge, then we can be confident that the entire tile is also outside the edge. The position of this test point is determined by the orientation of the edge as indicated in the table given in FIG. 9.

The edge itself can be described using the equation $$y = mx + c$$

where x and y are coordinates of the screen, m represents the gradient of the line, and c is a constant. The valuation of mx+c at the corner of a tile will give a value that is greater than, less than or equal to the y coordinate of that point. The comparison of the two values will indicate whether the point lies on the inside or outside of the edge. The interpretation of this result depends on the orientation of the edge as given in the table in FIG. 9.

For each edge of the triangle, each tile in the rectangular bounding box must be processed in this way to decide whether or not it should be excluded from the minimal set.

Figure 10:
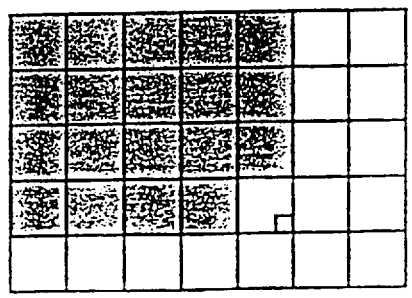
FIG. 10 shows a rectangular set of tiles with a test point.

It should be noted that the test point at the corner of a tile is also the test point for a larger rectangular set of tiles. In FIG. 10, knowing that the tile marked where the test point is outside an edge means that all the shaded tiles must also be outside that edge. In this example, where the test point is at the bottom right, it is most efficient to process the tiles of the rectangular bounding box from right to left and from bottom to top, in all there is a large number of tiles may be excluded from the minimal set with the minimum number of tests. When the test point is in a different corner of the tile, the order of processing would be changed accordingly.

What is claimed is:

1. A method for shading a 3-dimensional computer generated image that comprises a set of pixels, said method including the steps of:

representing each object in the image as a set of flat polygons, each polygon being a surface defined by a set of vertices and being in a defined orientation relative to an image plane;

for each polygon, supplying vertex data that define the location of the vertices of the polygon in the image and that define the orientation of the surface of the polygon relative to the image plane;

for each polygon, generating edge surface-defining data based on the vertex data that define a plurality of edge surfaces for the polygon, each edge surface separating the image into a region potentially inside the polygon surface and a region that is outside of the polygon surface, each edge surface being a flat surface that extends perpendicularly to the image plane;

for each pixel over which the polygon surface may extend, deriving a depth value for the polygon surface at the pixel based on the data defining the orientation of the polygon surface;

for each pixel over which the polygon surface may extend, determining if the pixel is inside the image regions in which the polygon surface is potentially present as defined by the edge surfaces of the polygon based on the edge surface-defining data for the polygon; and, if, as a result of said determining step, it is determined that the pixel is inside the image regions defined by each of the edge surfaces of the polygon in which the polygon surface is potentially present, storing the depth value of the polygon surface at the pixel for subsequent processing.

2. The method according to claim 1, in which no edge clipping is required when a polygon intersects a boundary of the image being shaded.

3. The method of claim 1, wherein, said step of determining if the pixel is inside or outside the image region defined by an edge surface in which the polygon surface is potentially is performed with a mathematical equation, the edge surface-defining data define equation coefficients and the pixel location is an input variable to the equation and wherein:

if the output result from executing the equation is positive, the pixel is potentially inside the region of the image in which the polygon surface is potentially present; and if the output result from executing the equation is negative, the pixel is outside of the region of the image in which the polygon surface is present.

4. The method of claim 1, wherein said step of determining if the pixel is inside or outside the region of the image defined by an edge surface in which the polygon is potentially present is performed for a line of pixels by deriving an edge mask for the line of pixels that defines the polygon surface, the edge mask indicating which of the pixels in the line are inside and outside of the region of the image in which the polygon surface is potentially present.

5. The method of claim 4, wherein said step of deriving the edge mask is performed using a clocked digital data processing equipment and in each clock cycle, an edge mask for a line of pixels is derived.

6. The method of claim 4, wherein said step of deriving the edge mask is performed for a plurality of separate rectangular sub-regions that collectively comprise the image, and said step of deriving the edge mask is performed on a line-by-line basis for a plurality of lines of pixels that define each rectangular-sub region.

7. The method of claim 4, wherein said step of deriving the edge mask for a polygon further includes the step of deriving a depth mask from the polygon from edges of the edge mask.

8. The method of claim 4, wherein, said step of determining if at least one of the pixels in the line is inside or outside the image region defined by an edge surface in which the polygon surface is potentially is performed with a mathematical equation, the edge surface-defining data define equation coefficients and the pixel location is an input variable to the equation and wherein:

if the output result from executing the equation is positive, the pixel is potentially inside the region of the image in which the polygon surface is potentially present; and if the output result from executing the equation is negative, the pixel is outside of the region of the image in which the polygon surface is present.

9. The method of claim 4, wherein said step of deriving an edge mask for the line of pixels is performed using an iterative search of the line of pixels to determine at which of the pixels is the transition between the pixels being in the image region that is potentially inside the polygon surface and the image region that is outside of the polygon surface.

10. An apparatus for shading a 3-dimensional computer generated image that comprises a set of pixels, said apparatus including:

means for representing each object in the image as a set of flat polygons, each polygon being a surface defined by a set of vertices and being in a defined orientation relative to an image plane;

means for supplying vertex data for each polygon, the vertex data defining the location of the vertices of the polygon in the image and said means for supplying vertex data also supplying data that define the orientation of the surface of the polygon relative to the image plane;

means for generating edge surface-defining data for each polygon based on the vertex data, each edge surface separating the image into a region potentially inside the polygon surface and a region that is outside of the polygon surface, each edge surface being a flat surface that extends perpendicularly to the image plane;

means for deriving a depth value for each pixel over which a polygon surface may extend, said means for deriving a depth value deriving a depth value for the polygon surface at the pixel based on the data defining the orientation of the polygon surface;

means for determining for each pixel over which the polygon surface may extend if the pixel is inside or outside the polygon surface, said means for determining making the determination based on the pixel location in the image and the polygon edge surface-defining data and evaluating if, the pixel location is in the regions defined by each of polygon edge surfaces in which the edge surface is potentially present, wherein, if the pixel location is in each of the regions in which the polygon surface is potentially present, the pixel is inside the polygon surface; and means for storing the depth value of the polygon surface at the pixel for subsequent processing, said means for storing the depth value configured to only performing the storing operation if, said means for determining if the pixel is inside or outside the polygon surface determines that the pixel is inside the polygon surface.

11. The apparatus of claim 10, wherein said means for determining if the pixel is inside or outside the polygon surface is configured to make the determination for each edge surface-defined region by performing a mathematical equation, the edge surface-defining data defining the equation coefficients and the pixel location being an input variable to the equation wherein:

if the output result from performing the equation is positive, said means for determining determines that the pixel is potentially inside the region of the image in which the polygon surface is potentially present; and if the output result from performing the equation is negative, said means for determining determines that the pixel is outside of the region of the image in which the polygon surface is present.

12. The apparatus of claim 10, wherein said means for determining if the pixel is inside or outside the polygon surface is part of a means for deriving an edge mask for the polygon surface along a line of pixels wherein said means for deriving an edge mask is configured to derive an edge mask indicating which pixels in the line are inside and outside of the region of the image in which the polygon surface is potentially present.

13. The apparatus of claim 12, wherein said means for deriving an edge mask includes clocked digital data processing equipment and in each clock cycle, the digital data processing equipment processes a line of pixels.

14. The apparatus of claim 12, wherein said means for deriving an edge mask is configured to make the determination for a line of pixels that comprise a rectangular sub-region of the image, the image being formed from a plurality of the rectangular sub-regions.

15. The apparatus of claim 12, wherein said means for deriving an edge mask further includes a means for deriving a depth mask from the polygon from edges of the edge mask.

16. The apparatus of claim 12, wherein said means for determining if the pixel is inside or outside the polygon surface is configured to make the determination for each edge surface-defined region by performing a mathematical equation, the edge surface-defining data defining the equation coefficients and the pixel location being an input variable to the equation wherein:

if the output result from performing the equation is positive, said means for determining determines that the pixel is potentially inside the region of the image in which the polygon surface is potentially present; and if the output result from performing the equation is negative, said means for determining determines that the pixel is outside of the region of the image in which the polygon surface is present.

17. The method of claim 4, wherein said means for deriving an edge mask for the line of pixels is configured to perform an iterative search of the line of pixels to determine at which of the pixels is the transition between the pixels being in the image region that is potentially inside the polygon surface and the image region that is outside of the polygon surface.

* * * * *